April 21, 1953 H. W. WELSH 2,635,483
VIBRATION DAMPER

Filed Dec. 30, 1949

INVENTOR.
HARVEY W. WELSH
BY Victor A. Behn
ATTORNEY

Patented Apr. 21, 1953

2,635,483

UNITED STATES PATENT OFFICE 2,635,483

VIBRATION DAMPER

Harvey W. Welsh, Wyckoff, N. J., assignor to Curtiss-Wright Corporation, a corporation of Delaware Application December 30, 1949, Serial No. 135,913

8 Claims. (Cl. 74—574)

This invention relates to torsional vibration damping means and is particularly directed to torsional vibration damping means utilizing a fluid containing a suspension of finely divided ferromagnetic particles.

The operating characteristics of a torsional vibration damper embodying the present invention are somewhat similar to those of a conventional viscous torsional vibration damper except that during normal operation the effectiveness of the damper of the present invention is substantially independent of temperature as compared to the effectiveness of said conventional viscous torsional damper. A conventional viscous torsional damper is a simple structure for damping torsional vibrations of a shaft. Such a damper generally comprises a casing rotatable with a shaft whose torsional vibrations are to be damped, said casing containing a high viscosity liquid within which a ring is floatingly immersed in clearance relation with the walls of said casing. In such a damper the liquid must be sufficiently viscous in order that the required damping forces can be obtained with reasonable clearance between the floating ring and its casing. However, even with the heavy silicone liquids now available the viscosity of the liquid decreases substantially with increase in temperature. Accordingly the damping effect of prior art viscous torsional dampers decreases substantially with increase in temperature.

A so-called "magnetic fluid" has recently been developed for clutches and is described in an article entitled "The Magnetic Fluid Clutch" published in the "Transactions of the American Institute of Electrical Engineers," pages 1308 to 1315, volume 67, 1948. This magnetic fluid comprises a liquid, such as oil, within which finely divided ferromagnetic particles, such as iron particles, are suspended. When such a fluid is placed in a magnetic field it seemingly solidifies to an extent dependent on the strength of the magnetic field. Accordingly, if the viscosity of the magnetic fluid in its unmagnetized condition is negligible, then its viscosity when magnetized is substantially independent of its temperature. An object of the present invention comprises the provision of a torsional vibration damper utilizing such a magnetic fluid. More specifically, the torsional damper of the present invention comprises a casing drivably connected to the shaft whose torsional vibrations are to be damped, said casing containing a magnetic fluid and a ring, having a plurality of circumferentially spaced magnets, is floatingly immersed in said fluid.

A further object of the invention will become apparent upon reading the annexed detailed description in connection with the drawing in which.

Figure 1:
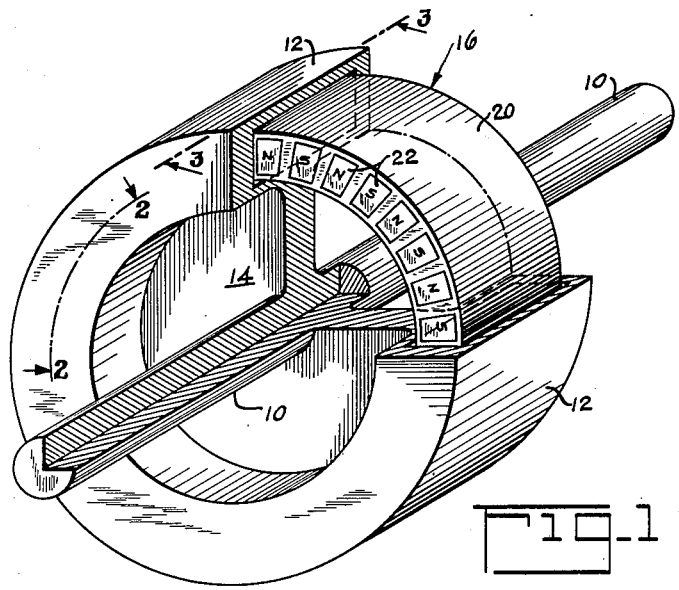
Figure 1 is a schematic perspective view partly in section of a torsional vibration damper embodying the invention.
Figure 2:
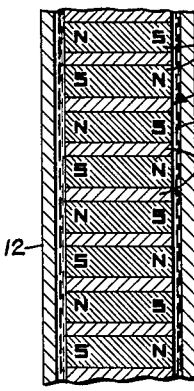
Figure 2 is a developed section taken along lines 2—2 of Figure 1.
Figure 3:
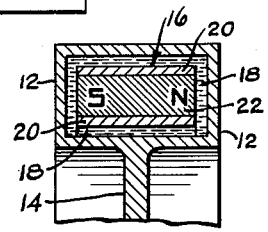
Figure 3 is a sectional view taken along lines 3—3 of Figure 1.

Referring now to Figures 1 to 3 of the drawing, a shaft 10 whose torsional vibrations are to be damped is provided with an annular housing or casing 12 concentric with and connected to said shaft by means of a web 14. A floating ring 16 is disposed within the casing 12. As schematically illustrated, the shaft 10 and casing 12 have an integral one-piece construction. In any practical embodiment, however, the casing 12 would have a multi-part construction in order to permit the ring 16 to be disposed therein and said casing would be rigidly secured to and about the shaft 10 for rotation with said shaft.

The casing 12 contains a magnetic fluid 18 such as described in the aforementioned article. This fluid comprises a liquid of low viscosity, preferably a light oil, within which finely divided ferromagnetic particles, such as iron particles, are suspended. This liquid is so chosen that its viscosity is negligible compared to the viscosity of the magnetic fluid 18 in its magnetized condition. As a result, during normal damper operation the viscosity of the fluid 18 when magnetized is substantially independent of temperature as compared to the viscosity of the liquid of a conventional viscous damper having a viscosity comparable with the viscosity of the fluid 18 in its magnetized condition.

The width and radial dimensions of the ring 16 are less than the corresponding dimensions of the interior of the casing 12. The ring 16 and the magnetic fluid 18 fill the casing 12 so that the ring 16 is floatingly immersed in the magnetic fluid 18 within the casing 12 in clearance relation relative to the interior walls of said casing. The ring 16 is made of suitable material 20 of relatively low magnetic permeability, as for example bronze, copper, etc. Imbedded within the low permeability material of the ring 16 are a plurality of circumferentially spaced and parallel bar-type permanent magnets 22 whereby the magnetic fluid 18 is subjected to the magnetic field of said magnets. Each of the permanent magnets 22 extends from one axial end of the ring 16 to its other axial end, the north pole of any one magnet and the south pole of the two adjacent magnets being disposed at the same end of the ring. With this arrangement, the poles of the magnets 22 alternate in polarity around each end of the ring 16.

The magnetic field of the permanent magnets 22 makes the magnetic fluid 18 behave as a very viscous liquid whereby, because of said viscosity, the ring 16 is effective to dampen torsional vibrations of the shaft 10. Since the viscosity of the magnetic fluid 18 within the casing 12 is substantially independent of temperature, the damping effect resulting from the viscosity of said fluid is substantially independent of temperature.

The casing 12 is preferably metallic so that any relative motion between the casing 12 and the ring 16 with its magnets 22 will cause eddy currents to be generated in the casing 12. Accordingly torsional vibrations of the shaft 10 result in the generation of eddy currents in the casing 12 thereby further damping said vibrations. This further damping effect is also substantially independent of changes in temperature. The magnitude of the eddy currents generated in the casing 12 is increased by the alternate north and south pole arrangement of the magnets 22 around each end of the ring 16.

Like a conventional viscous type torsional damper, the damper of the present invention has a simple construction which, because of the absence of relatively-moving engaging mechanical parts, is substantially trouble-free. As compared to a conventional viscous torsional vibration damper, however, the effectiveness of the damper of the present invention is relatively unaffected by changes in temperature.

The damper illustrated in Figures 1 to 3, is not tuned to any frequency of torsional vibration. If desired, however, the damper may be so tuned in a manner schematically illustrated in Figure 4.

Figure 4:
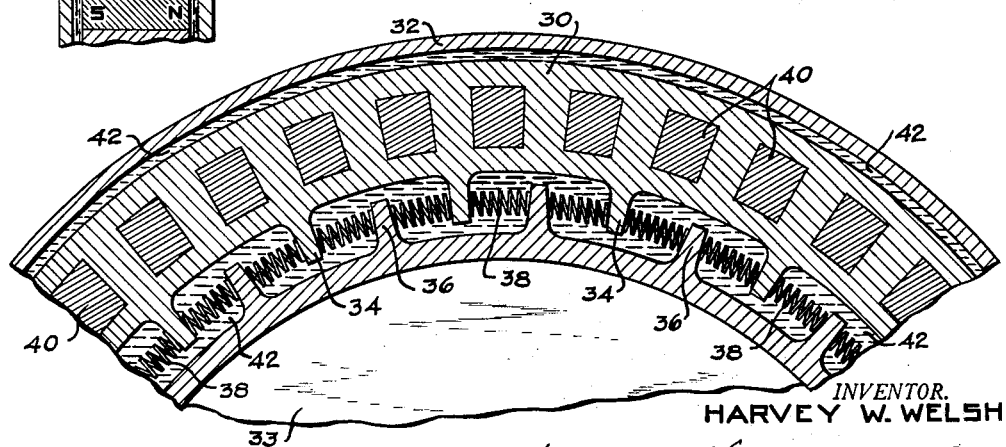
Figure 4 is a transverse sectional view of a modified construction.

In Figure 4 a floating ring 30 and casing 32 have been substituted for the floating ring 16 and casing 12 of Figures 1 to 3. The casing 32 is concentric with a shaft (not shown) whose torsional vibrations are to be damped, a web 33 connecting said shaft and casing. The floating ring 30 and casing 32 are provided with radially overlapping and circumferentially spaced projections 34 and 36, respectively. In addition a spring 38 is disposed between each adjacent pair of projections 34 and 36 whereby the springs 38 oppose relative rotation of the casing 30 and ring 32. Preferably the construction of Figure 4 is otherwise like that of Figures 1 to 3. Accordingly the body of the ring 30 is made of low permeability material and said ring is provided with a plurality of circumferentially spaced and parallel permanent magnets 40 imbedded in said low permeability material, said magnets preferably being disposed in a manner similar to that illustrated in Figures 1 and 2. In addition, as in Figure 1, the casing 32 is filled with a magnetic fluid 42 whereby the magnets 40 make said fluid quite viscous.

With this construction of Figure 4, the springs 38 provide the floating ring 30 with a natural frequency of vibration about its axis. This tuned construction greatly increases the effectiveness of the damper for damping torsional vibrations of the shaft having a frequency equal to said natural frequency but said tuned construction makes the damper substantially ineffective at other frequencies. Obviously the tuned damper construction of Figure 4 could also be provided in a viscous damper employing a conventional non-magnetic viscous liquid and a non-magnetic floating ring in place of the magnetic fluid 42 and the ring 30.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. Apparatus for damping torsional vibrations of a rotating shaft; said apparatus comprising a casing adapted to be driven by said shaft; a fluid within said casing having the property that its viscosity increases in a magnetic field; a floating ring co-axially disposed within said casing and immersed in said fluid; and magnet means carried by said ring for subjecting said fluid to a magnetic field.

2. Apparatus for damping torsional vibrations of a rotating shaft; said apparatus comprising a metallic casing adapted to be driven by said shaft; a fluid within said casing having the property that its viscosity increases in a magnetic field; a floating ring co-axially disposed within said casing and immersed in said fluid, said ring being of relatively low permeability compared to ferromagnetic material; and a plurality of permanent magnets carried by said ring for subjecting said fluid to the magnetic field of said magnets.

3. Apparatus for damping torsional vibrations of a rotating shaft; said apparatus comprising a casing adapted to be driven by said shaft; a fluid within said casing; said fluid comprising a liquid having finely divided particles of ferromagnetic material suspended therein; a floating ring co-axially disposed within said casing and immersed in said fluid, said ring being of relatively low permeability compared to said particles; and a plurality of permanent magnets carried by and circumferentially spaced about the axis of said ring for subjecting said fluid to the magnetic field of said magnets.

4. Apparatus for damping torsional vibrations of a rotating shaft; said apparatus comprising a casing adapted to be driven by said shaft; a fluid within said casing; said fluid comprising a liquid having finely divided particles of ferromagnetic material suspended therein; a floating ring co-axially disposed within said casing and immersed in said fluid, said ring being of relatively low permeability compared to said particles; and a plurality of permanent magnets carried by said ring and disposed with their poles adjacent to the axially spaced ends of said ring with the magnetic poles at each end of said ring alternating in polarity around said end.

5. Apparatus for damping torsional vibrations of a rotating shaft; said apparatus comprising a metallic casing adapted to be driven by said shaft; a fluid within said casing; said fluid comprising a liquid having finely divided particles of ferromagnetic material suspended therein; a floating ring co-axially disposed within said casing and immersed in said fluid, said ring being of relatively low permeability compared to said particles; and a plurality of circumferentially spaced bar-type permanent magnets each carried by and extending between the axially spaced ends of said ring with the magnetic poles of said magnets alternating in polarity around each end of said ring.

6. Apparatus for damping torsional vibrations of a rotating shaft; said apparatus comprising a casing to be driven by said shaft; a fluid within said casing, said fluid comprising a liquid having finely divided ferromagnetic particles suspended therein; a floating ring co-axially disposed within said casing and immersed in said fluid; and magnet means carried by said ring for subjecting said fluid to a magnetic field.

7. Apparatus for damping torsional vibrations of a rotating shaft; said apparatus comprising a casing to be driven by said shaft; a fluid within said casing, said fluid comprising a liquid having finely divided ferromagnetic particles suspended therein; a floating ring co-axially disposed within said casing and immersed in said fluid; and a plurality of permanent magnets carried by said ring and circumferentially spaced about the axis of said ring.

8. Apparatus for damping torsional vibrations of a rotating shaft; said apparatus comprising a casing to be driven by said shaft; a fluid within said casing, said fluid comprising a liquid having finely divided ferromagnetic particles suspended therein; a floating ring co-axially disposed within said casing and immersed in said fluid; and a plurality of permanent magnets carried by said ring and circumferentially spaced about the axis of said ring with adjacent poles of adjacent magnets being of opposite polarity.

HARVEY W. WELSH.

References Cited in the file of this patent

UNITED STATES PATENTS

| Number | Name | Date |
|---|---|---|
| 1,718,207 | Anibal | June 25, 1929 |
| 2,198,763 | Draminsky | Apr. 30, 1940 |
| 2,514,139 | O'Connor | July 4, 1950 |

FOREIGN PATENTS

| Number | Country | Date |
|---|---|---|
| 485,592 | Belgium | Nov. 13, 1948 |

OTHER REFERENCES

Publications: Raymond Engineering Laboratory, Inc., Sept. 17, 1948, Middletown, Conn., "Operating Instructions for the Raymond Model 663 Fluid Magnetic Clutch."

Business Week, Dec. 18, 1948, pps. 48–50, "Magnetized Iron-Oil Mixes in New Jobs."

General Electric Review, Sept. 1949, pps. 16–20, "Permanent Magnets in Drag Devices and Torque Transmitting Couplings."